Patented Feb. 11, 1930

1,746,994

UNITED STATES PATENT OFFICE

HENRY W. DENNY, OF SOUTH ORANGE, NEW JERSEY, ASSIGNOR TO SUN-MAID RAISIN GROWERS OF CALIFORNIA, OF FRESNO, CALIFORNIA, A CORPORATION OF CALIFORNIA

RAISIN SIRUP AND PROCESS FOR MAKING THE SAME

No Drawing.   Application filed October 8, 1925. Serial No. 61,168.

The primary object of the present invention is the provision of a process for the production of sirup from raisins.

A further object of the invention is the provision of a sirup made from raisins of such character that it can be utilized as a sweetening agent in the factory or household.

Another object of the invention is the provision of a raisin sirup which is substantially free from tartrates, tannin bodies, protein, and other impurities.

A still further object of the invention is the provision of a raisin sirup which is substantially free from insoluble matter which will not dissolve upon the application of heat, such as lime compounds and the like.

A more particular object of the invention is the provision of a purified deflavored raisin sirup.

Heretofore, raisin sirup has not been produced on a commercial scale due to difficulties encountered in preparing a sirup with the proper degree of freedom from raisin flavoring matters, color, insoluble or gritty matter, and from other impurities.

The manufacture of sirup from raisins presents a fundamentally different problem from the manufacture of sugar from cane or beet juices. This difference exists primarily in that the ultimate object in refining cane or beet juices is to produce dry crystalline sugars and the sirup or molasses formed is a by-product, the degree of success being inversely proportional to the amount of sirup produced. The ultimate object of the present invention is the production of sirup, or a magma of crystals in sirup, from raisins.

Furthermore, the juices of cane and beets contain primarily sucrose, whereas raisin juices contain primarily invert sugar, and it is an object of cane and beet sugar refining to eliminate the invert sugar which is done by either destroying or removing it from the juices.

A fundamental difference also exists in that the various non-sugar impurities in cane and beet juices can be, and are, largely removed by purging and washing the crystals after their formation. In the manufacture of raisin sirup no such opportunity is provided for the elimination of undesirable substances, and the purification must consist in carefully controlled chemical and physical procedures such as precipitation and adsorption.

A further difference exists between sugar refining and the making of sirup from raisins in the presence of two major classes of impurities, namely, tartaric acid and its salts, and tannin-like bodies, found in raisins that are not present, at least to any substantial degree, in cane and beet juices. The removal of these two classes of impurities is desirable—the tartaric acid class, as it gives an undesirable flavor to the sirup and the tannin class as it forms black or dark colored compounds, especially upon coming in contact with iron. Since it is desirable that a commercial sirup, such as is produced by the present process, shall be capable of remaining in contact with iron without suffering deterioration, its commercial value would be impaired if the tannin bodies were left in.

The primary step to secure the removal of the desirable sugars from the raisins may be accomplished by any conventional method as by leaching, centrifuging, or the raisins may be specially treated first to break or remove the skins and seeds and then pressed, squeezed or centrifuged with water, steam and the like to obtain an extract of the desired sugar content.

The raw liquor, as has been pointed out, contains coloring matter, tartrates, tannin bodies and other undesirable compounds which are characteristic of the raisin and which it is desirable to remove.

The coloring matters may be removed to a large extent by treating the liquor with materials having high adsorptive power, such as fuller's earth, acid clay, bone or vegetable chars. It is well known that certain of these agents, particularly vegetable chars, decolorize more effectively in an acid medium and it is sometimes found expedient to give the liquor a decolorizing treatment with vegetable char before removing the tartaric acid compounds, thereby taking advantage of the relatively high acidity of the raw liquor due to their presence. The decolorizing step may be carried on immediately after the liquor has been extracted from the raisins and with or without filtering to take out stems, pulp, etc., or in some cases it may prove advantageous to introduce the adsorptive material at this stage and not remove the same until later in the process, or the complete step of decolorization can be deferred until near the end of the process. The amount of adsorptive material used, as well as the temperature and the time of the treatment, depends upon the amount of color present and the proportion which it is desired to remove.

Treatment to remove the tartrates may now be carried on. Although it is possible to accomplish this step by adding lime to the liquor to form insoluble calcium tartrate and removing the precipitate, it is preferable and more economical to first remove the major portion of the tartrates by the following method. The crude battery liquor may be filtered, then concentrated by evaporation to approximately 60° Brix. During the evaporating step crystallization of tartrate compounds begins in the evaporating pans. After evaporation the liquor is permitted to stand for several days or until complete crystallization has taken place. Removal of the tartrate compound crystals is then accomplished by filter pressing or other suitable method.

After dilution further removal of the tartrates may be accomplished by adding lime to the crude filtered liquor in sufficient amount to combine with practically all of the tartrate present to form insoluble calcium tartrate. In practice it has been found desirable to use lime and carry the liming to a point where the alkalinity is equal to 0.5 grams CaO per 100 c. c. using phenolphthalein as an indicator. Under these circumstances the precipitation of the tartrate takes place very rapidly, although satisfactory results may be obtained at a much lower alkalinity.

The liming eliminates most of the tannin bodies as they either unite with the lime to form a precipitate or are carried down by the voluminous precipitate produced and also gives rise to a most important improvement in the color, flavor and stability characteristics of the sirup. Other non-sugars and impurities are also removed by this precipitate due to its adsorptive capacity. It would be advantageous to remove this precipitate at this point, but owing to its gelatinous and slimy nature it is impracticable to remove it by ordinary methods of filtration, without first admixing some substance which will favorably influence its physical characteristics. This may be satisfactorily accomplished by the addition of an inert substance over which the gelatinous precipitate may be distributed. Kieselguhr will serve the purpose satisfactorily or insoluble calcium carbonate may be caused to form in the mass by the introduction of $CO_2$ gas. When the gas is used it is passed into the liquor until the alkalinity is reduced to a point where there is substantially no re-solution of the impurities originally precipitated. In practice this is found to be at a point where the titratable alkalinity indicates about .02–.05 grams of CaO per 100 c. c. using phenolphthalein as an indicator.

The precipitates formed can now be filtered out. To facilitate filtration the liquor can be heated to temperatures as high as 60° C., but care must be taken that the temperature does not reach a point where marked destruction of the sugars occurs as evidenced by excessive darkening of the extract.

In some cases it may be found advantageous to carry on carbonation in two steps. This may be done by first carbonating to a point where the titratable alkalinity indicates about 0.1 grams of CaO per 100 c. c., using phenolphthalein as an indicator, filtering the liquor which, as stated above, may be heated, then carbonating a second time to a point where the precipitated $CaCO_3$ formed by the combining of $CO_2$ and soluble Ca compounds begins to re-dissolve. As stated, this point is reached when the alkalinity is approximately equivalent to .02–.05 grams CaO per 100 c. c. as determined by titrating with phenolphthalein as an indicator. After the second carbonation the liquor is again filtered.

Whichever method is utilized, a considerable quantity of lime may still remain in solution which it is desirable to remove as completely as possible, as otherwise it tends to form undesirable compounds in the finished sirup.

This is accomplished by adding $H_3PO_4$, or an equivalent acid, which combines with the calcium present. In practice such acid is added until an excess is present. At this point the pH value of the liquor usually is 6.5 as determined by the colorimetric indicators of Clark and Lubs.

The calcium compounds are then thrown out of solution by adding an alkali such as NaOH, KOH, etc., until the pH value rises to a point between 8—9. The completeness of this last precipitation is tested by filtering a sample and adding alkali to it. If no further precipitate falls sufficient alkali has been added. If a precipitate does drop in the trial sample, additional alkali is added to the main batch and further test is made. In practice it has been found that sufficient alkali usually is present when the pH value has increased to 8.3.

If partial color reduction has been practiced in the original acid liquor as hereinbefore described, color reduction may be completed at this point by treating with vegetable char in accordance with the usual methods. Or the complete step of color reduction can be performed at this point.

The liquor containing precipitated calcium phosphate is filtered until brilliantly clear and in order to obtain optimum conditions for color reduction the filtrate may be acidified with phosphoric acid or other acid to a pH value between 3.5 and 7.0. In practice a pH value of 5.5 has been found advantageous where vegetable char is used. If instead of using vegetable char as described above it is desirable to use bone char it will be necessary to operate under conditions of acidity suitable to this agent.

After decolorization the sirup may be evaporated to the required density, found in general practice to be approximately 80% solids.

The finished sirup may be supersaturated with respect to certain of its sugars and may be gradually transformed through the consequent partial crystallization into a buttery mass or magma consisting of a mixture of crystals and sirup. It has been found that such a mixture has many highly desirable characteristics from a merchandising standpoint and in practice measures may be taken to induce such crystallization in order to insure a product of uniform character. The crystals referred to will dissolve upon the application of heat and if the sirup has been properly prepared it is free from compounds such as lime compounds and the like which are not readily soluble upon heating.

Sirup prepared by the process stated has the advantage that it is deflavored, retaining none of the flavor characteristics of raisins, and can be utilized in many instances where a flavored raisin sirup would prove undesirable.

It is to be understood that the word "sirup" as used in the specification and claims of this application includes both the clear sirup and the mixture of sirup and crystals referred to above.

The principal refining effect due to the addition of the lime appears to result from the alkalinity caused by such addition. The alkalinity resulting from the addition of lime appears to cause many changes in the impurities present in the sirup with the result that the undesirable characteristics are for a great part removed or can be readily removed by subsequent treatments. In this alkaline treatment it is desirable to have a pH value or a hydrogen ion concentration which will be given alkalinity equivalent to 0.5 grams of calcium oxide to every 100 cc. using phenolphthalein as an indicator. The expression "raisin-like sirup" as used in the claims is intended to include not only raisin sirup but also other sirups which present a similar refining problem.

I claim:

1. A raisin sirup substantially free from tartaric acid compounds.

2. A raisin sirup substantially free from tannin bodies.

3. A purified raisin sirup substantially free from matter which is not readily soluble upon heating.

4. A raisin sirup substantially free from tartaric acid compounds and tannin bodies.

5. A raisin sirup substantially free from tartaric acid compounds and flavoring matters characteristic of raisins.

6. A raisin sirup substantially free from tartaric acid compounds and matters which will not readily dissolve upon heating.

7. A raisin sirup substantially free from tannin bodies and matters which are not readily soluble upon heating.

8. A purified raisin sirup substantially free from tartaric acid compounds, tannin bodies and material which is not readily soluble upon heating.

9. A purified raisin sirup from which a substantial portion of the coloring matters have been removed.

10. A raisin sirup from which substantially all of the tannin bodies have been removed and the coloring matters substantially reduced.

11. A raisin sirup which is substantially free from tartaric acid compounds, tannin bodies, and in which the coloring matters are substantially reduced.

12. A deflavored raisin sirup substantially free from flavoring matters characteristic of raisins.

13. A raisin sirup which is substantially free from tannin bodies and flavoring matters.

14. A purified raisin sirup which is substantially free from flavoring matters, and from material which is not readily soluble upon heating.

15. A raisin sirup which is substantially free from tartaric acid compounds, tannin bodies, flavoring matters, and material which is not readily soluble upon heating.

16. A raisin sirup which is substantially free from tartaric acid compounds, tannin bodies, flavoring matters, material not readily soluble upon heating and in which the coloring matters have been substantially reduced.

17. The process for the production of raisin sirup, which comprises extracting the saccharine matter from the raisins, removing tartrates from the extract, adding the hydroxide of an alkaline earth metal, precipitating the alkaline earth metal, filtering, adding a soluble reagent which will form an alkaline earth metal salt more insoluble in the sirupy reaction mixture than the carbonate to unite with any alkaline earth metal remaining in the extract, adding a caustic alkali, filtering, treating the extract with a decolorizing agent, and concentrating the liquor to a final sirup.

18. The process for the production of raisin sirup, which comprises extracting the sugars from the raisins, treating the extract with lime, carbonating, filtering, further carbonating, adding a soluble reagent which will form an alkaline earth metal salt more insoluble in the sirupy reaction mixture than the carbonate, treating the extract with a decolorizing agent, and concentrating the liquor to a final sirup.

19. The process for the production of raisin sirup which comprises extracting the sugars from raisins, filtering, adding lime, passing carbon dioxide gas into the liquor, filtering, again treating with carbon dioxide, filtering, adding phosphoric acid and then a caustic alkali, filtering, again acidifying the liquor, treating the acidified liquor with a decolorizing agent, and finally concentrating the liquor to the desired density.

20. The process of preparing a refined raisin sirup which comprises extracting the raisins with water, concentrating and then filtering the extract, alkalinizing with an alkaline compound of an alkaline earth metal, acidifying with an acidic material which will form insoluble alkaline earth metal salts, removing the alkaline earth metal compounds from the liquid and then decolorizing.

21. The process of removing alkaline earth metal from raisin extracts or sirup which comprises carbonating the liquid until no further precipitate forms, filtering, adding a small quantity of phosphoric acid and then adding a caustic alkali.

22. The process of refining raisin extracts which comprises concentrating a raisin extract to reduce its non-sugar solid content, filtering and then diluting, and finally alkalinizing with an alkaline compound of an alkaline earth metal.

23. The process of refining raisin extracts which comprises removing a large amount of the acidity present by means of concentration and then alkalinizing the liquor until it acquires a hydrogen ion concentration approximately equivalent to 0.5 grams of CaO per 100 cc.

24. In the purification of raisin sirups the steps of extracting soluble materials from the raisin and then alkalinizing the extract with the hydroxide of an alkaline earth metal.

25. In the purification of raisin sirups the steps of extracting soluble materials from the raisin and then alkalinizing the extract with lime.

26. In the purification of raisin sirups the steps of extracting soluble materials from the raisin and then alkalinizing the extract.

27. A method of refining a raisin sirup which comprises preparing an aqueous raisin extract, alkalinizing the extract, filtering and acidifying the filtrate.

28. A method of refining a raisin sirup which comprises preparing an aqueous raisin extract, filtering the concentrate and then alkalinizing the filtrate.

29. In the production of raisin sirup the steps of extracting the sugar content from the raisin with water, treating with lime, carbonating the solution, filtering out the precipitate, adding an acid which will form an alkaline earth metal salt more insoluble in the sirupy reaction mixture than the carbonate to the solution to combine with residual lime, adding a caustic alkali and filtering.

30. The process for the production of raisin sirup, which comprises extracting the raisins, treating the extract with a soluble alkaline reacting alkaline earth metal compound, passing carbon dioxide gas into the liquor, filtering out the precipitate, further treating the liquor with carbon dioxide gas, then treating the liquor with phosphoric acid and adding an alkali metal alkali to precipitate residual alkaline earth metal compounds, filtering out the precipitate, again acidifying the liquor, treating with a decolorizing agent, filtering and concentrating the liquor to a final sirup.

In testimony whereof I have hereunto subscribed my name.

HENRY W. DENNY.